Oct. 31, 1944.  H. H. BIXLER  2,361,815

COMPRESSOR ASSEMBLY

Filed April 17, 1941

Inventor:
Harley H Bixler,
by Harry E. Dunham
His Attorney.

Patented Oct. 31, 1944

2,361,815

UNITED STATES PATENT OFFICE 2,361,815

COMPRESSOR ASSEMBLY

Harley H. Bixler, Schenectady, N. Y., assignor to General Electric Company, a corporation of New York Application April 17, 1941, Serial No. 389,036

10 Claims. (Cl. 309—20)

This invention relates to compressor assemblies and more particularly to compressor assemblies especially adapted for use in domestic type refrigerator cabinets.

It is an object of my invention to provide a new and improved compressor or pump assembly having relatively few parts, which is easily assembled and disassembled, which is rugged in construction, and which is efficient and economical in operation.

It is another object of my invention to provide a new and improved piston assembly for compressors and the like.

It is also an object of my invention to provide a piston assembly for compressors and the like having a new and improved means for lubricating the assembly.

It is a further object of my invention to provide a new and improved piston assembly for compressors and the like which embodies means for minimizing the wear on the engaging parts of the piston and connecting rod assembly.

It is still another object of my invention to provide a compressor or pump assembly arranged in such a way that the load on the connecting rod is hydrostatically balanced with respect to the load on the piston.

Further objects and advantages of my invention will become apparent as the following description proceeds, and the features of novelty which characterize my invention will be pointed out with particularity in the claims annexed to and forming a part of this specification.

Figure 1:
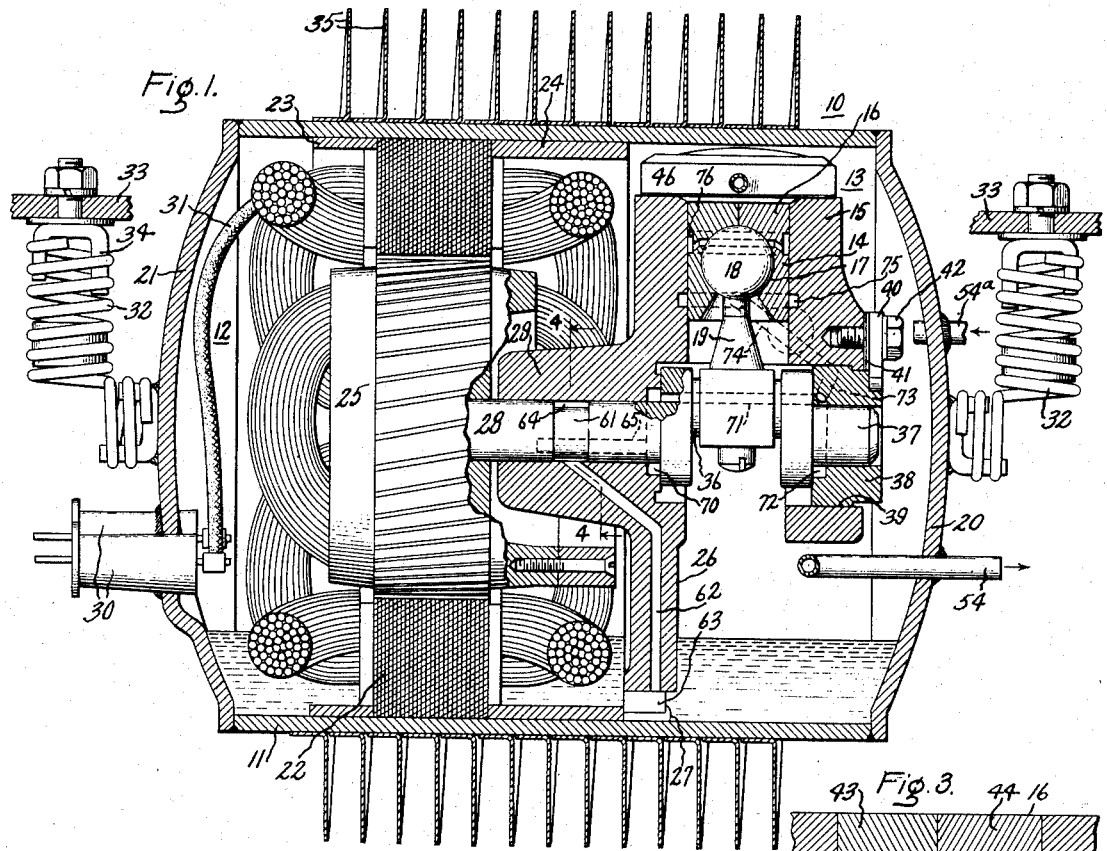
Figure 3:
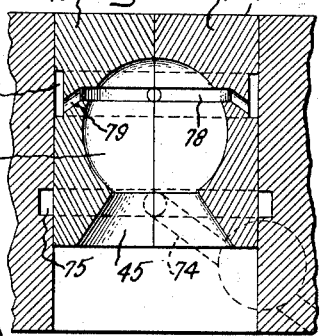
Figure 2:
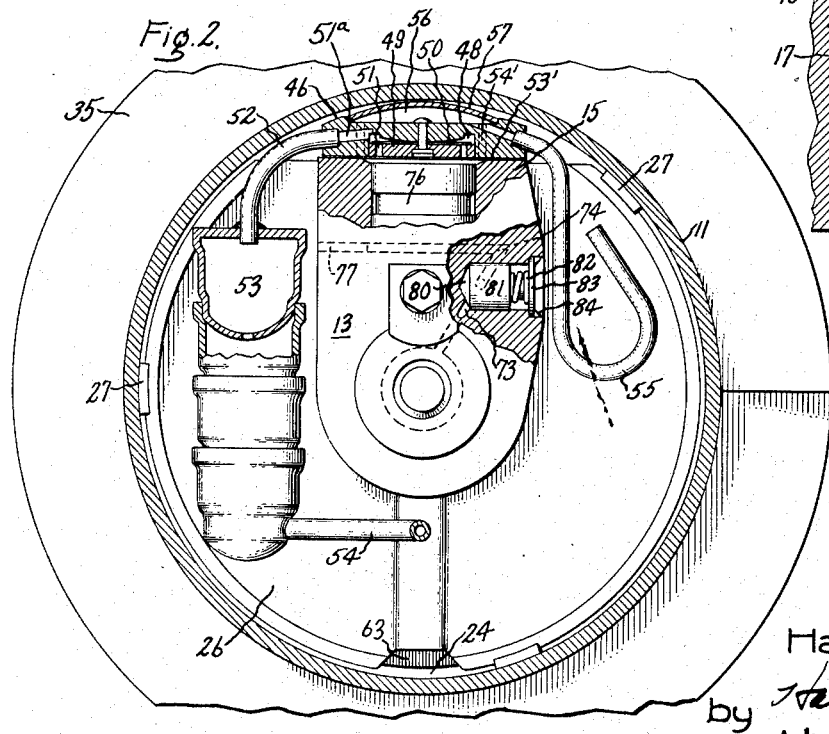
Figure 4:
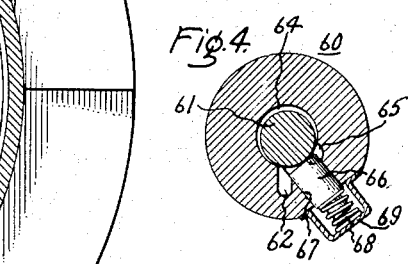

For a better understanding of my invention reference may be had to the accompanying drawing in which Fig. 1 is a sectional view of a motor compressor unit embodying the principles of my invention; Fig. 2 is an end view of the compressor assembly shown in Fig. 1, partly in section, as viewed with the end plate removed; Fig. 3 is an enlarged view in section of the piston shown in Fig. 1; and Fig. 4 is an enlarged sectional view taken along the line 4—4 of Fig. 1.

Referring to the drawing, I have provided a motor compressor unit 10 of the hermetically sealed type especially adapted for use in refrigerators of the domestic type, the casing of which encloses a motor 12 and a compressor assembly 13. The compressor assembly comprises a cylinder bore 14 disposed within the cylinder block 15 and a two-part piston 16 provided with an internal recess or socket 17 for engagement with the end portion 18 of the connecting rod 19. In order to minimize wear on the contacting surfaces of the piston 16 and the end portion 18, adequate lubrication must be provided. As hereinafter described, I provide means for conducting lubricant to the socket or recess, the piston and the connecting rod being so arranged within the cylinder that the lubricant is subjected to the cylinder pressure during the compression stroke of the compressor and therefore is forced into the clearance space between the socket or recess and the end of the connecting rod in accordance with cylinder pressure. In this manner a film of lubricating substance is maintained between the adjacent surfaces.

Describing my invention in greater detail, there is illustrated in the drawing a hermetically sealed compressor unit 10 comprising a motor 12 and a compressor unit 13. The motor compressor unit is disposed within a casing which includes a generally cylindrical shell 11 and end plates 20 and 21 suitably secured thereto as by welding. It will be seen that the casing serves as a motor shell, the laminated stator 22 of the motor being disposed in engagement with the inner surface of the shell 11. The stator is held against axial movement by sleeves 23 and 24 pressed into the shell. In order to support the rotor 25 of the motor and the compressor 13, I have provided a frame member 26 machined so that it may be pressed into a rabbet provided in the shell or sleeve member 24. Small sections of the rabbet are suitably turned over the frame as indicated by the numeral 27, as by calking. In order to support the rotor 25, I have provided a shaft 28 suitably journaled in an enlarged portion 29 of the frame 26, that portion of the frame serving as a bearing for the shaft 28. Thus, the frame 26 is employed not only to support the compressor but also to secure the stator in place and maintain the proper air gap between the rotor and stator of the motor. Heat developed within the unit is efficiently conducted into the shell 11 because of the good thermal contact established by the press fit of the stator parts.

In order to conduct electric current to the windings of the motor 12 I have provided suitable terminals 30 extending through and suitably sealed with respect to the end plate 21 of the compressor casing and leads 31 extending between the terminals and the stator winding.

In order to support the motor compressor unit in operative position with respect to a refrigerator cabinet or the like, I have illustrated the use of resilient mounting members in the form of springs 32 suitably supported from the ends of the casing and a support 33, as a refrigerator cabinet base for example, by means of supporting members 34.

In order to assist the conduction of heat away from the motor compressor unit, I have provided suitable fins 35 secured in intimate heat exchange relationship with the exterior of the unit 10, as by soldering or brazing for example.

The cylinder block 15 for the compressor is carried by the frame 26. In the illustrative form of my invention shown in the drawing, the cylinder block is integral with the frame. Thus, the frame 26 is suitably bored to provide the cylinder bore 14, within which is reciprocally arranged the piston 16. In order to reciprocate the piston, there is provided a crank shaft attached to or integral with the motor shaft 28 and a connecting rod 19 suitably secured to the crank 36. The portion 37 of the shaft 28 opposite the motor is suitably journaled in a bushing 38 retained in a suitably formed opening 39 in the cylinder block portion 15 of the frame. The bushing 38 is suitably retained within the opening 39 as by means of a washer 40 and suitable spacing shims 41 and a threaded fastening member or screw 42.

As best seen in Fig. 3, the piston 16 is cylindrical in form but is divided into a plurality of parts as two parts, 43 and 44, in the drawing, along an axial or longitudinal plane, the parts being accurately machined so as to provide a very close fit. The parts of the piston should be similar in shape and, if a two-part piston is employed, the parts should preferably be substantially identical. Each half or part of the piston is provided with a hemispherical recess thereby providing a spherical recess 17 when the parts are placed in matching relationship for the accommodation of the enlarged spherical end 18 of the connecting rod 19. The lower end of the piston is cut away as indicated by the numeral 45 to permit movement of the connecting rod. This construction forms a self-aligning bearing in the piston so that inaccuracies in the frame and other parts do not affect the bearing alignment of the connecting rod. With this arrangement, there are no fastening devices required for the piston assembly. The piston halves and the connecting rod are maintained in operative relationship by the inter-engagement or interlocking relationship between the piston and the cylinder, the shape of the connecting rod end portion and the shape of the recess or seat 17 cooperating to retain the piston parts in longitudinal alignment. Thus, the piston assembly is maintained in operative relation or piston solely by the inter-engagement between the connecting rod end and the piston and between the walls of the cylinder bore and the piston, that is, when the piston parts and connecting rod are assembled in the cylinder.

A muffle box 46 is suitably secured at the top of the cylinder bore block as by means of suitable threaded screws extending through the muffle box into threaded engagement with suitably tapped bores in the cylinder block. The muffle box is provided with a suitably arranged cylindrical recess 48. A valve plate 49 is disposed in the recess, the valve plate being formed originally two or three thousandths inches over size and pressed in, thereby providing a tight fit. The leading edge of the valve plate 49 is preferably chamfered in order to pilot or guide the valve plate to the completed position during assembly. There is provided an exhaust valve 50 which is preferably clamped between the wall of the recess 48 and the valve plate 49, the aforementioned parts being secured as by means of a rivet extending centrally through the parts. During the exhaust stroke of the compressor, the exhaust gas passes through a plurality of suitably arranged passages 51 in the valve plate into the recess 48 and thence through a suitable passage 51a and an exhaust conduit 52 into a multi-compartment exhaust muffler 53 and a conduit 54 extending through the end plate 20 to a suitably arranged condenser not shown. The pressed-in valve plate is extremely advantageous because a minimum amount of space is occupied by the muffle box valve assembly. Moreover, the valve plate when pressed in can be thinner than normally constructed because it is supported at the circumference thereof by reason of the pressed fit at the edge and is supported at the center by means of the fastening means shown. The fastening means, such as a rivet, serves not only to hold the assembly together but it also locates the exhaust valve.

I have illustrated the use of an intake valve 53' suitably clamped between the muffle box 46 and the cylinder block 15. The intake valve shown is preferably formed from metal and is preferably provided with a substantially circular, centrally-disposed opening and may be formed by a punching operation. The opening in the center of the valve disk is made large enough to prevent blocking the exhaust passages 51. Inasmuch as the intake valve is clamped about the outer periphery, during the intake stroke the material around the centrally located opening will be displaced downwardly. When the valve is opened the entire outer edge of the opening is thus moved downwardly thereby permitting the gas to be drawn into the compressor through a plurality of intake passages 54' extending through the muffle box 46. The fluid to be worked, as vaporized refrigerant in refrigeration systems, is admitted to the unit 10 through the suction conduit 54a. The vaporized gas or working fluid is drawn into the compressor through a conduit 55 and a chamber 56 located on the top of the muffle box. The chamber is formed by suitably securing a cover member 57 of any suitable shape, bowed in the illustrated embodiment of my invention, the space 56 serving as an intake muffler. The inner edge of the cylinder bore is preferably chamfered or tapered to provide a guide and stop for the flexible intake valve.

The advantage of the illustrated valve assembly lies in the fact that the complete periphery of the cylinder is open so that there is minimum clearance volume, the valves are well supported so that breakage thereof is minimized and operation is quiet because the valves have small lifts and finally the assembly is very compact because the valve plate is flush with the muffle box. The above-described valve assembly and muffle box is described and claimed in my co-pending application Serial No. 408,612, filed August 28, 1941, and now Patent No. 2,339,048, January 11, 1944, assigned to the same assignee as my present invention.

Means for lubricating the compressor has been provided. Referring to Figs. 1 and 4, there is shown an oil pump associated with the shaft 28. In order to provide a rotary pump, the shaft 28 is provided with an eccentric reduced portion 61, this portion serving as a rotor or impeller. The frame 26 is provided with an intake passage 62 extending from the bottom or cutaway portion 63 of the frame 26 and the chamber 64 formed between the eccentric portion 61 and the adjacent frame 26. In order to provide an outlet conduit or passage from the pump, I have provided an axially extending groove 65 in the enlarged portion of the frame. In order to divide the intake and exhaust sides of the oil pump, I have provided a piston or vane 66 suitably arranged in a bore 67 in the enlarged portion 29 of the frame. The vane is biased to a position engaging the eccentric portion 61 in any suitable manner as by means of a spring 68 disposed between the outer end of the member 66 and a suitable supporting member 69. When the shaft 28 is rotating it will be seen that lubricant will be drawn up the passage 62 from the lubricant reservoir in the lower portion of the case and discharged into the groove 65. The lubricant will then be forced through the groove into an annular recess 70 disposed in the frame adjacent the crank portion of the shaft, through a passage 71 extending axially through the crank 36 to an annular recess 72 in the bushing 38, and through passages 73 and 74 to an annular groove 75 in the cylinder wall. A cooperating annular groove 76 is formed in the outer surface of the piston. The groove 76 registers with the groove 75 when the piston is in its extreme retracted position. When in this position lubricant flows into the groove 76 from the groove 75. At the same time, the working fluid, such as refrigerant, in the cylinder bore is not under compression and hence there is little or no tendency for it to leak past the piston. As the piston is moved upwardly, the working fluid in the cylinder bore is compressed and at the same time the groove 76 moves out of registry with the groove 75. The compressed working fluid in the cylinder bore tends to leak between the piston and the surrounding wall of the cylinder bore. This leaking working fluid enters the groove 76, however, and displaces a portion of the lubricant therefrom. Some of this displaced lubricant is forced into the small clearance space between the piston and the wall of the cylinder and forms a seal, thus effectually preventing the escape of compressed refrigerant from the cylinder bore without the necessity of providing packing rings or the like on the piston. When the piston is again moved to its retracted position, the groove 76 comes into registry with the groove 75 and since the lubricant is being rapidly circulated through the groove 75, any gaseous working fluid which is entrapped in the groove is carried away by a stream of lubricant and later returned to the main body of gaseous refrigerant or working fluid through the conduit or passage 77 as best seen in Fig. 2.

As above described, as the piston begins its compression stroke, the piston motion causes groove 76 to valve off groove 75. A consideration of the leakage conditions around the body of the piston will indicate that the compressed refrigerant can leak down from the end of the piston to the oil groove 76 but further leakage down the wall of the cylinder can be only lubricant so long as groove 76 is even partially filled with lubricant. Further study will indicate that the pressure applied to the lubricant in groove 76 is substantially the same as the pressure of the compressed refrigerant in the cylinder. This is true because of the high viscosity of the oil or lubricant relative to that of the gas, and the effect of this viscosity difference on the pressure gradient along the body of the piston.

I have provided means for lubricating the ball and socket connection between the piston and the ball 18 of the connecting rod and for minimizing the wear between the walls of the recess and the ball portion 18. A generally annular groove 78 is formed in the spherical socket or recess of the piston as shown in Fig. 3. This groove is connected to the lower end of groove 76 by means of one or more upwardly extending grooves or passages 79. By this means lubricant under the pressure existing in groove 76 is applied to the groove 78 and thence to the space between the piston and the ball portion 18 of the connecting rod. It will be remembered that this pressure is substantially the same as the cylinder pressure and lubricant will be forced into the space between the recess and the ball portion 18 in proportion to that pressure, thereby preventing actual contact between the end portion or ball and the piston. The pressure of compression will also force lubricant through the space between the piston halves into the space between the piston recess and the end portion of the connecting rod. Thus, that portion of the gas load on the piston which corresponds to the vertically projected area of the end portion or ball of the connecting rod has been hydrostatically balanced with respect to the piston load. By making the size of the ball such that its vertically projected area is as nearly the same as the area of the piston as is practical, the greater portion of the gas load of the piston can be effectively balanced against the hydrostatic pressure of the lubricant in the clearance space between the ball and the walls of the recess 17.

At the beginning of the intake stroke there is a relatively great reduction in the cylinder pressure so that a momentarily high pressure remains in the grooves 76 and 78. Since there is now no piston load on the ball or end portion, this pressure tends to force lubricant out through the space between the piston halves and between the piston and the cylinder wall. However, the working fluid, or refrigerant gas in this case, as well as lubricant is trapped in the groove 76. Since the working medium is expansible and the lubricant is practically non-compressible, the working medium expands, thereby tending to maintain lubricant between the piston and the end portion 18 so that an ample supply of lubricant fills the clearance space between the piston and the end portion at the beginning of the compression stroke.

It should be noted that if the clearance between the piston and the cylinder wall is too large, an imperfect seal will be provided. Further the pressure drop at the beginning of the intake stroke will be so sudden that the pressure in the grooves 76 and 78 and the space between the piston and the end portion will be so much greater than the cylinder pressure that the piston and the end portion will be suddenly forced apart and cause the lower surface of the end portion or ball 18 to strike the lower portion of the recess 17 adjacent the opening 45 and cause stress and wear at that point. For these reasons the piston should fit sufficiently close with respect to the cylinder wall to obviate these disadvantages and yet have a sufficiently loose fit to permit the cylinder pressure to be transmitted to the grooves and the clearance space between the piston and the end of the connecting rod, I have found that a piston having an external diameter of approximately 1.0625 inches disposed in a cylinder bore having a diameter of the order of 1.0627 to 1.0629 inches provides satisfactory results.

I have also provided means for regulating the lubricant pressure in the shaft bearings. As best seen in Fig. 2, passages 73 and 74 communicate with a chamber 80 formed in the cylinder block, the passage 73 communicating with the inner end of the chamber and the passage 74 communicating with the central portion thereof. The opening of passage 73 to the chamber 80 is closed off under low pressure conditions by means of a piston 81 biased to the closed position by means of a spring 82 disposed between a plate-like member 83 and the outer end of the piston 81. The member 83 may be retained in position in any suitable manner as by peening as indicated by the numeral 84. When the lubricant pressure on the pump side of the piston 81 has been built up to a predetermined amount by the lubricant pump, the piston 81 will be forced to right, as viewed in Fig. 2, against the bias of the spring 82 thereby uncovering the end of the passage 74 and permitting the passage of lubricant to the piston. Whenever the oil or lubricant pressure falls below that predetermined value, the spring 82 will overcome the oil pressure and close off the passage 73.

While I have shown a particular embodiment of my invention, I do not desire my invention to be limited to the particular construction shown and described and I intend in the appended claims to cover all modifications within the spirit and scope of my invention.

What I claim as new and desire to secure by Letters Patent of the United States, is:

1. In combination with a cylinder having a cylinder bore, a piston arranged for reciprocation in said bore, said piston being divided longitudinally into a plurality of matching parts, a connecting rod having an end portion thereof operatively engaging with said piston, said end portion and said piston being constructed and arranged for interlocking association when assembled so that said operative engagement is maintained solely by the interengagement between the piston parts and the connecting rod when assembled in the cylinder bore said piston having a lubricant groove therein in communication with the space between said end portion and the adjacent portion of said piston, means for supplying lubricant to said groove during the intake stroke of said piston, and means operative during the compression stroke of said piston for utilizing the pressure of fluid compressed by said piston to force lubricant from said recess into said space.

2. In combination, a cylinder having a cylinder bore, a piston arranged for reciprocation in said bore, a connecting rod, an end of the connecting rod seating in a recess in the piston, said end being subjected to a varying load during the compression stroke of the piston, said piston having a groove in its outer wall and communicating with the recess, means for supplying lubricant to the groove during the intake stroke of said piston, the above parts being arranged and constructed so that lubricant in said groove is subjected to the cylinder pressure during the compression stroke and forced from said groove into the clearance space between the recess and said end whereby a film of lubricant is maintained between said end and the adjacent recess surface.

3. In combination with a cylinder having a cylinder bore, a piston arranged for reciprocation in said bore, a connecting rod, a ball carried by said connecting rod, a recess in said piston receiving said ball, an annular groove in a wall of said cylinder, a second annular groove in the face of said piston and communicating with said first groove near the end of the intake stroke of the piston, a third annular groove in the face of said recess, means for conducting a lubricant to said first groove whereby the lubricant is conducted to said second groove when said grooves register, means including a passage communicating between said second and said third grooves for conveying said lubricant from said second to said third groove, said piston and said cylinder being so constructed and arranged that when said first and second grooves are out of register the lubricant in said second groove, said passage and said third groove is subjected to the cylinder pressure whereby lubricant is forced between said recess and the surface of said ball during the compression stroke.

4. In combination with a cylinder having a cylinder bore, a piston arranged for reciprocation in said bore, said piston being divided axially into matching parts, matching hemispherical recesses in the adjacent faces of said parts for providing a spherical seat in said piston, a connecting rod having an enlarged spherically shaped portion on an end thereof, said spherical portion being carried in said spherical seat, an annular groove in the wall of said cylinder, a second annular groove in the face of said piston, said grooves being so disposed that registration therebetween occurs approximately at the end of the intake stroke of said piston, a third groove in the face of said spherical seat, means for conducting lubricant to said first groove whereby the lubricant is conducted to said second groove when said grooves register, means including a passage communicating between the second and third grooves for conveying said lubricant from said second to said third grooves, said piston and said cylinder being so constructed and arranged that when said first and second grooves are out of registration the lubricant in said second groove, said passage and said third groove is subjected to the cylinder pressure whereby lubricant is forced into the clearance space between said recess or spherical face and the surface of said spherical end portion during the compression stroke, the area of the vertically projected surface of the spherical portion being substantially as great as the area of the top of the piston.

5. In combination, a cylinder having a cylinder bore, a piston arranged for reciprocation in said cylinder bore for compressing a working fluid, a connecting rod, an end portion of the connecting rod seating in a recess in the piston, said end portion being subjected to a varying load during the compression stroke of the piston, means for conducting lubricant to the recess, means for supplying lubricant to said conducting means during the intake stroke of said piston, means for admitting working fluid to said conducting means and for subjecting the lubricant therein to the cylinder pressure during the compression stroke and forcing the lubricant and said working fluid into the clearance space between the recess and the end portion according to the cylinder pressure, said means being arranged and constructed in such a manner that the expansion of the working fluid in said recess will cause lubricant to be maintained in said recess during the period in which the lubricant and working fluid are not subjected to the force of compression.

6. In combination with a cylinder having a cylinder bore, a piston arranged for reciprocation in said bore, a connecting rod having an end portion in operative engagement with said piston and being subjected to varying load during the compression stroke of said piston, said piston and said end portion having a clearance space therebetween and said piston having a groove in its outer surface in communication with said clearance space, means for supplying lubricant to said groove near the end of the intake stroke of said piston, and means for admitting compressed fluid to said groove during the compression stroke of said piston to force lubricant into said clearance space.

7. In combination with a cylinder having a cylinder bore, a piston arranged for reciprocation in said bore, a connecting rod having an end portion in operative engagement with said piston and being subjected to varying load during the compression stroke of said piston, said piston and said end portion having a clearance space therebetween and said piston having a groove in its outer surface in communication with said clearance space, means for supplying lubricant to said groove near the end of the intake stroke of said piston, and means for admitting compressed fluid to said groove during the compression stroke of said piston to force lubricant into said clearance space and for maintaining the lubricant in said space during the intake stroke of said piston.

8. In combination with a cylinder having a cylinder bore, a piston arranged for reciprocation in said bore, a connecting rod, a ball carried by said connecting rod, a recess in said piston receiving said ball, an annular groove in a wall of said cylinder, a second annular groove in the face of said piston and communicating with said first groove near the end of the intake stroke of the piston, a third annular groove in the face of said recess and above the bottom of said second groove, means for conducting a lubricant to said first groove whereby the lubricant is conducted to said second groove when said grooves register, means including an upwardly extending passage opening into the bottom of said second groove and communicating between said second and said third grooves for conveying said lubricant from said second to said third groove, said piston and said cylinder being so constructed and arranged that when said first and second grooves are out of register the lubricant in said second groove, said passage and said third groove is subjected to the cylinder pressure whereby lubricant is forced between said recess and the surface of said ball during the compression stroke.

9. In combination, a cylinder having a cylinder bore, a piston arranged for reciprocation in said bore, a connecting rod having an enlarged spherically shaped end portion, said spherical portion being arranged for engagement in a recess in the piston, said piston and said spherical portion being subjected to varying load during the compression stroke of the piston, said piston having a groove in its outer wall, means for supplying lubricant to the groove near the end of the intake stroke of the piston, means for conducting lubricant from said groove to the recess, the aforementioned parts being arranged and constructed so that the lubricant in the groove is subjected to the cylinder pressure during the compression stroke and forced from the groove into the clearance space between the recess and the spherical portion in accordance with the cylinder pressure, the size of the spherical portion being such that its vertically projected area is as nearly as practicable the same as the area of the top of the piston.

10. In combination with a cylinder having a cylinder bore, a piston arranged for reciprocation in said bore, a connecting rod, a ball carried by said connecting rod, a recess in said piston receiving said ball, an annular groove in a wall of said cylinder, a second annular groove in the face of said piston and communicating with said first groove near the end of the intake stroke of the piston, a third annular groove in the face of said recess, means for conducting a lubricant to said first groove whereby the lubricant is conducted to said second groove when said grooves register, means including a passage communicating between said second and said third grooves for conveying said lubricant from said second to said third groove, said piston and said cylinder being so constructed and arranged that when said first and second grooves are out of register the lubricant in said second groove passage and third groove is subjected to the cylinder pressure whereby lubricant is forced between said recess and the surface of said ball during the compression stroke, the size of the ball being such that its vertically projected area is as nearly as practicable the same as the area of the top of said piston.

HARLEY H. BIXLER.